United States Patent Office 2,918,298
Patented Dec. 22, 1959

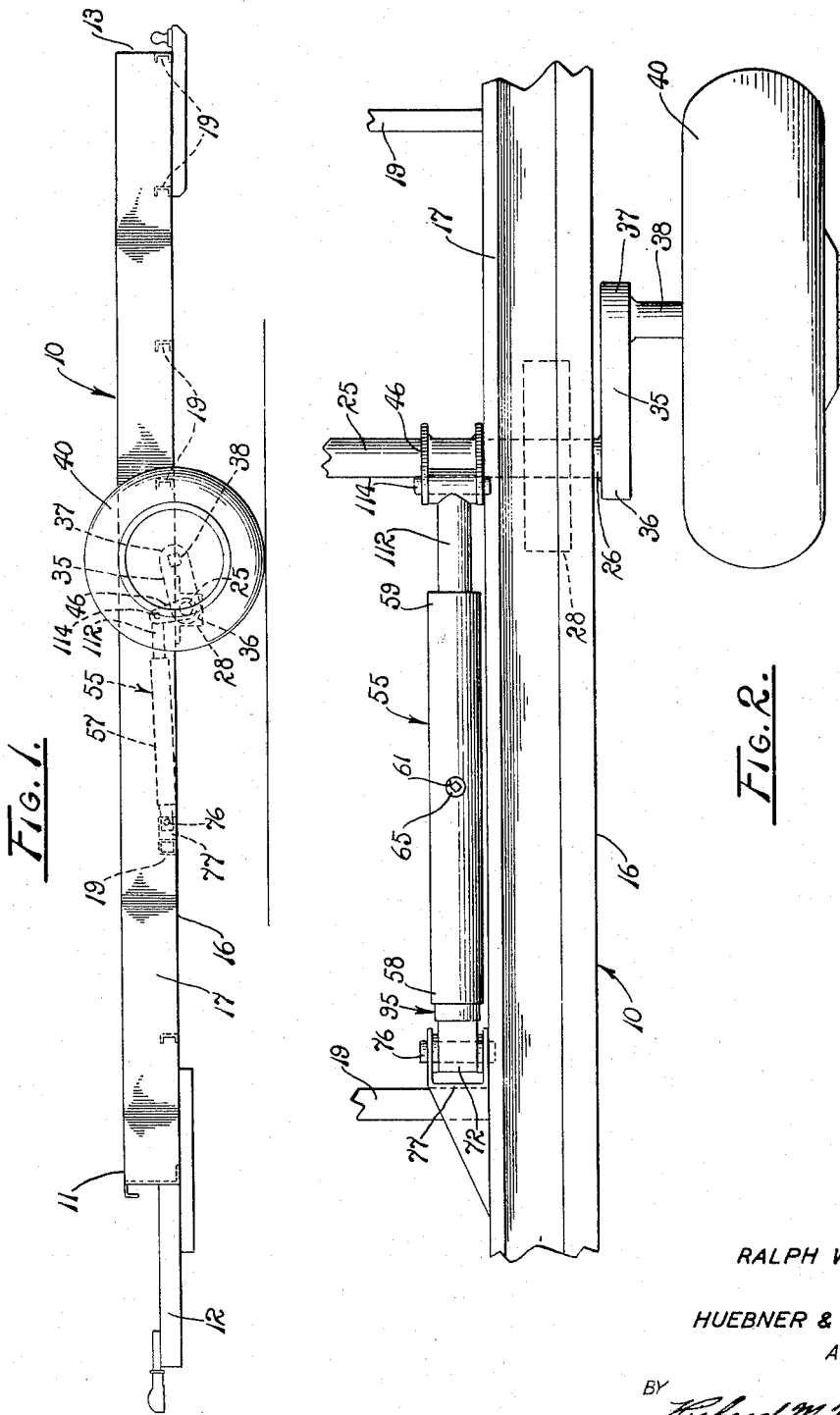

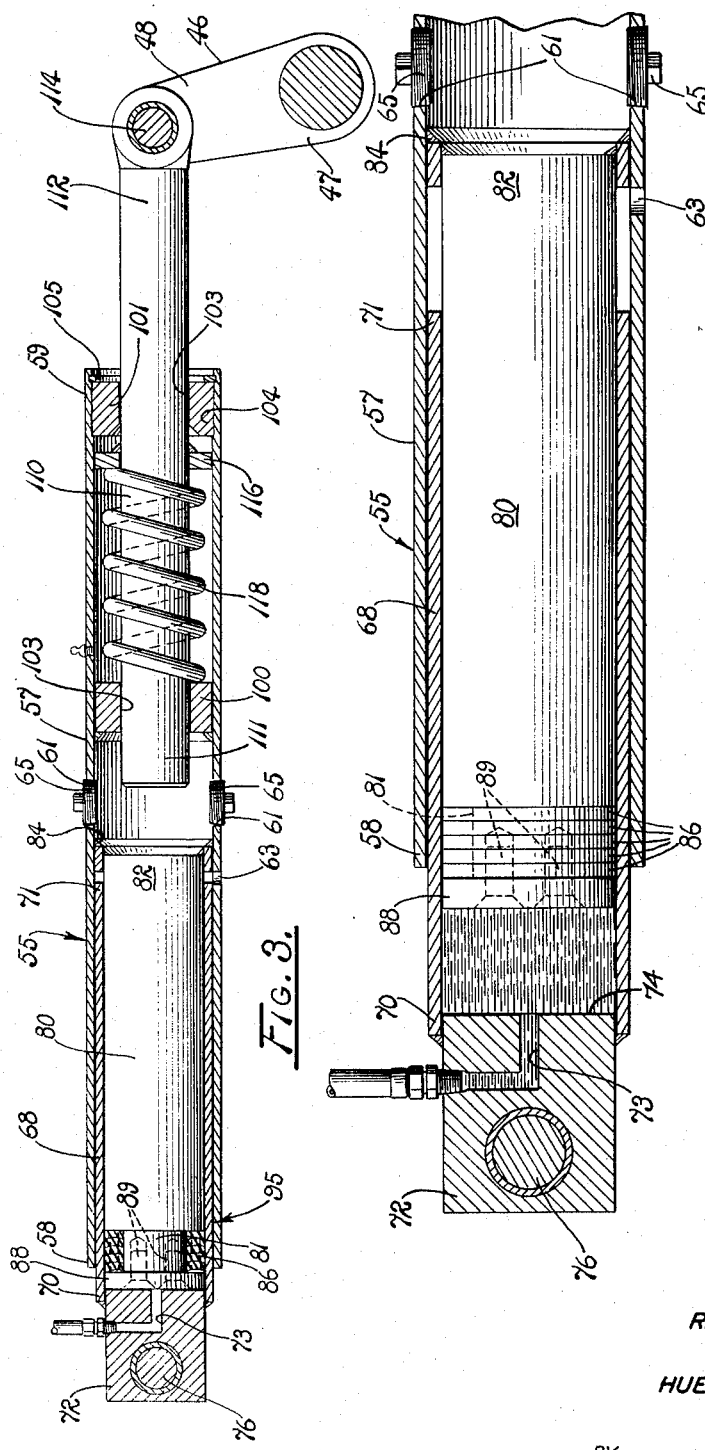

2,918,298

TELESCOPICALLY ADJUSTABLE CONTROL APPARATUS

Ralph W. Starr, Selma, Calif., assignor to Selma Trailer & Manufacturing Company, a corporation of California Application February 3, 1958, Serial No. 712,905

8 Claims. (Cl. 280—43.23)

The present invention relates to a telescopically adjustable control apparatus and more particularly to an apparatus for providing elevationally adjustable cushioned support for a vehicle.

It is conventional to transport crops from the field to barns, packing houses, and the like, or from farm to market, in boxes loaded in trailers or similar vehicles. Sometimes, when it is necessary to harvest crops after periods of rainfall or thaw, these trailers must be driven over soft and muddy terrain. Because of the heavy loads carried, not only the wheels but the frame or chassis of such a trailer can very easily become immovably mired. This frequently results from the wheels sinking so deeply into soft ground that the frame or even the bed of the trailer rests on the ground.

Quite obviously, therefore, it is desirable to keep the vehicle chassis as high as possible while passing over soft ground. However, at other times, it is desirable to maintain the chassis as low as possible to facilitate loading and unloading of the trailer as well as safe transport thereof.

Still further, because trailers of this nature must also be capable of traversing hard and frequently bumpy terrain, provision must be made to cushion the frame against elevational shock and vibration during transit.

Therefore, it is an object of the present invention to provide a telescopically adjustable control apparatus of the character described.

Another object is to provide an elevationally adjustable cushioned supporting apparatus for vehicles and the like.

Another object is to provide an apparatus for enabling elevationally adjustable cushioned support of a vehicle.

Another object is to minimize the miring of load bearing vehicles to such an extent that their frames or other chassis elements rest on the ground.

Another object is to facilitate drawing loaded vehicles, such as trailers, over soft terrain such as that frequently encountered on farms.

Another object is to economize and speed transport of produce and other goods.

Another object is to provide an elevationally adjustable mobile frame which can automatically be raised during transit and lowered for loading and unloading.

Another object is to provide a controlling apparatus of the nature described which is protected against the adverse effects of dirt, mud, moisture, and the like, during operation.

Another object is to provide an apparatus, as above described, which is remotely controllable.

Other objects are to provide a supporting apparatus which is simple and economical to construct and install, dependable in operation, durable in form, and adapted for use on a variety of vehicles.

These, together with other objects, will become more fully apparent upon reference to the following description and accompanying drawings.

In the drawings:

Fig. 1 is a side elevation of a vehicle incorporating the control apparatus of the subject invention.

Fig. 2 is a fragmentary, somewhat enlarged, top plan view of a portion of the vehicle and showing the subject control apparatus.

Fig. 3 is a still further enlarged, fragmentary, longitudinal vertical section taken through the control apparatus of the present invention in a fully retracted position of the apparatus.

Fig. 4 is a still further enlarged, fragmentary, longitudinal section of a portion of the control apparatus shown in partially extended position.

Referring more particularly to the drawings, a trailer, typifying one of many vehicles with which the present invention may be employed, is generally indicated in Fig. 1 by the numeral 10. The trailer has a forward end 11 from which is forwardly extended a hitch frame 12, and a rearward end 13. Further, the trailer includes a substantially horizontal frame or chassis 10 having opposite longitudinally extended side members 17 rigidly interconnected by transversely extended end and intermediate members 19. Inasmuch as the specific construction of the trailer and its frame is not critical to the present invention, no further description is given.

An elongated substantially cyclindrical shaft 25 having opposite outer ends 26 is rotatably journaled in bearings 28 mounted underneath the frame 16 intermediate the opposite ends 11 and 13. The shaft is substantially horizontally disposed transversely of a predetermined line of travel of the frame substantially parallel to the longitudinal side members 17. The outer ends of the shaft extend slightly outwardly from the longitudinal side members.

Arms 35 provide inner ends 36 rigidly secured to the opposite outer ends 26 of the shaft 25 and outer ends 37 radially outwardly extended from the shaft in generally rearward direction relative to the frame 16. Stub axles 38 are secured to the outer ends of the arms and extend laterally outwardly therefrom in substantially coaxial relationship on opposite sides of the frame. Circular ground engaging wheels 40 of conventional construction are rotatably concentrically journaled on the stub axles and are adapted for ground engagement to support the frame for earth traversing movement along said predetermined line of travel.

Rigid levers 46 provide inner ends 47 rigidly secured to the shaft 25 in inwardly spaced relation to the adjacent outer ends 26 of the shaft and on the opposite sides of the bearings 28 from the arms 35. The levers provide outer ends 48 radially outwardly extended from the shaft in substantially right-angular relationship with the arms 35 and generally upwardly with respect to the shaft.

Elongated telescopic control members 55 pivotally interconnect the frame 16 and the levers 46 on opposite sides of the frame. As best seen in Figs. 3 and 4, each control member includes an elongated substantially cylindrical intermediate sleeve 57 having a frame end portion 58, an opposite shaft end portion 59, intermediate opposed welding access apertures 61, and an air release port 63 intermediate said ends. Plugs 65 are screwthreaded in closing relation in the apertures.

Each control member 55 also includes an elongated cylinder 68 longitudinally reciprocally slidably fitted within the frame end portion 58 of the sleeve 57 and providing an outer end 70 and an inner end 71. The cylinder includes an outer head 72 providing an L-shaped fluid passageway 73 establishing communicaton between the exterior of the head and an inwardly disposed face 74 of the head. A substantially horizontal pivot pin 76 is extended through the head in parallel relation to the shaft 25 and mounts the control member in a bracket 77 on the frame 16 for elevational pivotal movement.

An elongated solid, cylindrical piston 80 includes a diametrically reduced outer end portion 81 adjacent to the outer end 70 of the cylinder 68 and an inner end portion 82 adjacent to the inner end 71 of the cylinder. The inner end portion of the piston is rigidly secured to the sleeve 57 intermediate its ends 58 and 59 and inwardly of the inner end 71 of the cylinder by means of a weld 84. It is for the purpose of performing this weld that the apertures 61 are provided. Annular packing members 86 circumscribe the outer end portion of the piston, and a cap 88 is placed thereover and secured by means of screws 89 for retaining the packing members in position. It is to be noted that the outwardly disposed face of the cap is adapted for flush abutment with the inwardly disposed face 74 of the cylinder head 72. The cylinder 68 and piston 80 constitute an hydraulic ram generally indicated by the numeral 95. The cylinder and the interconnected piston and sleeve are relatively longitudinally slidably reciprocal between an extended frame elevating position, as partially shown in Fig. 4, at which time the opposed faces of the cylinder head and the cap are in longitudinally spaced relation, and a retracted frame lowering position with the described faces in contact, as shown in Figs. 1, 2 and 3, and with the inner end 71 of the cylinder in spaced relation to the air release port 63. The utilization of the sleeve having a frame end portion enclosing the cylinder and the further provision of the packing members insures a dependable seal and protects the hydraulic ram from the entrance of dirt, and other foreign matter, to the contacting surfaces of the ram. The sleeve also imparts additional strength to the ram especially needed during extension thereof.

Inner and outer bearing blocks 100 and 101 are rigidly secured within the shaft end portion 59 of the sleeve 57 in longitudinally spaced relation to each other and provide axially aligned bores 103 which are concentric to the sleeve and thus coaxial with the cylinder 68. The inner bearing block is preferably welded within the sleeve, this weld being also effected through the access apertures 61. However, the outer bearing block is preferably fitted in an annular recess 104 within the sleeve and held in this position by means of a snap ring 105.

An elongated substantially cylindrical control rod 110 is longitudinally slidably fitted in the bores 103 of the bearing blocks 100 and 101 and, in addition to the cylinder 68 and the sleeve 57, constitutes the third major portion of the telescopic control member. The rod has an inner end 111 extended inwardly of the inner bearing block and an outer end 112 extended outwardly of the sleeve and pivotally connected to the outer end 48 of the lever 46 by means of a horizontal pin 114 parallel to the shaft 25. An annular collar 116 is secured, as by welding, to the rod intermediate its ends and between the inner and outer bearing blocks. Further, the collar is in peripheral sliding engagement with the sleeve and is more closely adjacent to the outer bearing block than the inner bearing block. A heavy duty, coiled, compression spring 118 encircles the rod between the collar and the bearing block and has opposite ends respectively bearing against the collar and inner block yieldably urging the rod outwardly of the sleeve.

*Operation*

The operation of the described embodiment of the subject invention is believed to be readily apparent and is briefly summarized at this point.

For the purpose of enabling a better understanding of the utility of the subject invention, the operation will be described in connection with the transporting of lugs of produce from the field to a packing house. The trailer 10 is connected to a drawing vehicle, such as a truck, not shown, by means of the hitch frame 12. In the field when the trailer is being loaded, the hydraulic ram 95 is retracted so that the arms 35 extend slightly upwardly and the frame 16 is in a lower position to facilitate loading.

After the trailer 10 is loaded, it is drawn over the ground being supported for earth traversing movement by the wheels 40. As the frame passes over hard and bumpy terrain, forces are applied upwardly on the wheels tending to rotate the shaft 25 in a counterclockwise direction, as viewed in Figs. 1 and 3. This tends to slide the rod 110 inwardly of the sleeve 57. However, the spring 118 resiliently resists inward movement of the rod and thus cushions the frame as it travels over the ground. It is to be observed that the spring is under initial compression incident to the weight of the frame resisting downward movement of the frame relative to wheels beyond a predetermined amount. Accordingly, notwithstanding passage of the trailer over uneven terrain, the springs tend to maintain the frame at a predetermined elevation.

Just prior to travel over soft or muddy ground, each hydraulic ram 95 is extended by allowing fluid to pass in through the passageway 73 against the cap 88 whereby the piston 80 is slid longitudinally outwardly of the cylinder 68. Any suitable hydraulic system may be employed for controlling the flow of fluid into and out of the hydraulic ram. Likewise, this hydraulic system may be controlled from the cab of the drawing vehicle, all in a manner well within the skill of those acquainted with the art.

Extension of the ram 95 slides the sleeve 57 toward the shaft 25 and longitudinally relative to the rod 110 to increase the compression of the spring 118 between the inner bearing block 100 and the collar 116. This increased compression applies greater force to the levers 46 pivoting the shaft 25 in a clockwise direction, as viewed in Figs. 1 and 3. This thrusts the arms 35 downwardly to raise the frame 16 relative to the wheels 40. The frame remains elevated as long as hydraulic pressure is aplied so that although the wheels may sink into the mud the frame is upwardly spaced therefrom. In this manner the drawing vehicle, not shown, can more easily pull the loaded trailer through the soft ground and the dangers of becoming stuck in the mud are minimized. Once solid ground is again reached, hydraulic pressure is relieved from the ram 95 to retract the ram and to relieve compression of the springs 118. Weight on the frame 16 forces the frame downwardly to raise the wheels 40 relative to the frame and thereby to rotate the shaft 25 in a counterclockwise direction. This shoves the rod 110 inwardly and returns the sleeve 57 and the piston 80 to retracted positions with the cap 88 in abutment with the inner faces 74 of the head 72. Lowering of the frame is likewise cushioned by the springs 118 in a manner similar to the action while traversing hard ground, as described above.

It will be evident from the foregoing that a highly useful telescopically adjustable control apparatus has been provided especially advantageous for elevationally adjustable cushioned support of a vehicle. Although it has principal utility in this respect, it will be evident that it may be employed for controlling other devices where similar problems are involved. In the environment particularized above, the apparatus facilitates motivation of a vehicle over soft and muddy terrain and minimizes the possibilities of becoming mired in the ground. Specifically, the apparatus enables adjustable elevational movement of a vehicle on its support wheels and cushions elevational movements of the wheels relative to the frame during travel over hard terrain.

Although the invention has been herein shown and described in what is conceived to be the most practical and preferred embodiment, it is recognized that departures may be made therefrom within the scope of the invention, which is not to be limited to the details disclosed herein but it is to be accorded the full scope of the claims so as to embrace any and all equivalent devices and apparatus.

Having described my invention, what I claim as new and desire to secure by Letters Patent is:

1. A telescopically adjustable control apparatus comprising an elongated sleeve having open opposite ends, an elongated control rod mounted in an end of the sleeve for longitudinal slidable movement inwardly and outwardly of the sleeve, resilient compression means interposed the sleeve and the rod yieldably urging the rod outwardly of the sleeve, a tubular member longitudinally slidably fitted in the end of the sleeve opposite from the rod having an outer closed end and an inner end, the closed end of the tubular member having a fluid passageway extending into the interior of the tubular member, an elongated piston longitudinally extended within the tubular member having an inner end secured to the sleeve intermediate its opposite ends, and means connected to the passageway in the closed end of the tubular member for delivering and releasing hydraulic fluid to and from the passageway longitudinally extending and retracting the tubular member and the sleeve and piston relative to each other.

2. A telescopically adjustable control apparatus adapted to be mounted on a support for motivating a controlled member movably mounted on the support between predetermined positions and for cushioning movement of such a controlled member between such positions comprising an elongated sleeve having open opposite ends; an elongated control rod mounted in an end of the sleeve for longitudinal slidable movement inwardly and outwardly of the sleeve and adapted to be connected to such a controlled member; resilient compression means interposed the sleeve and the rod yieldably urging the rod outwardly of the sleeve; an hydraulic ram including a cylinder longitudinally slidably fitted in the end of the sleeve opposite from the rod having an outer closed end adapted to be mounted in such a support and an inner end terminating short of the rod, the closed end of the cylinder having a fluid passageway extending into the interior of the cylinder, and an elongated piston longitudinally extended within the cylinder having an inner end secured to the sleeve intermediate its opposite ends; and means connected to the passageway in the closed end of the cylinder for delivering and releasing hydraulic fluid to and from the passageway longitudinally extending and retracting the cylinder and the sleeve and piston relative to each other for motivating the controlled member between such positions.

3. In a vehicle including a frame, a ground engaging member adapted to support the frame for earth traversing movement along a predetermined line of travel, an elongated shaft, means rotatably journaling the shaft in the frame in substantially horizontal position transversely of said line of travel, the shaft being rotatable in opposite frame elevating and lowering directions, an arm rigidly connected to the shaft and radially extended therefrom, means mounting the ground engaging member on the arm, and a lever rigidly secured to the shaft and radially extended therefrom in angular relation to the arm, the combination comprising an elongated telescopically adjustable control member having relatively longitudinally slidably interconnected frame end, intermediate, and shaft end portions, means pivotally interconnecting the frame and the frame end portion of the control member for relative elevational movement therebetween around an axis substantially parallel to the shaft, means pivotally interconnecting the shaft end portion of the control member and the lever for relative pivotal movement therebetween around an axis substantially parallel to the shaft, the end portions of the control member being individually movable relative to the intermediate portion between extended and retracted positions, and resiliently compressible means interposed the intermediate and shaft end portions of the control member yieldably urging these portions into extended positions and yieldably urging the shaft to rotate in said frame elevating direction incident to relative extension of the frame end and intermediate portions of the control member, the shaft being rotatable in said frame lowering direction upon retraction of said frame end and the intermediate portions of the control member.

4. In a vehicle including a support frame, a ground engaging wheel adapted to support the frame for earth traversing movement along a predetermined line of travel, an elongated shaft, means rotatably journaling the shaft in the frame in substantially horizontal position transversely of said line of travel, a wheel arm rigidly connected to the shaft and radially extended therefrom, a stub axle extended from the arm substantially parallel to the shaft, the wheel being concentrically rotatably mounted on the axle, and a lever rigidly secured to the shaft and radially extended therefrom in angular relation to the arm, a telescopically adjustable apparatus for rotating the shaft and cushioning rotation thereof incident to elevational movement of the wheel relative to the frame comprising an hydraulic ram including telescopically slidably interconnected frame and extended end portions reciprocally movable between an extended frame elevating position and a retracted frame lowering position, means pivotally connecting the frame end portion of the ram to the frame, telescopically slidably interconnected members respectively rigidly connected to the extended end portion of the ram and pivotally connected to the lever, and compressible means yieldably urging the telescopically interconnected members apart, said compressible means being compressed incident to extension of the ram to rotate the shaft in one direction to elevate the frame relative to the wheel and said compressible means being compressed incident to elevational movement of the wheel relative to the frame resiliently to cushion such movement.

5. In a vehicle including a support frame, a ground engaging wheel adapted to support the frame for earth traversing movement along a predetermined line of travel, an elongated shaft, means rotatably journaling the shaft in the frame in substantially horizontal position transversely of said line of travel, a wheel arm rigidly connected to the shaft and radially extended therefrom, a stub axle extended from the arm substantially parallel to the shaft, the wheel being concentrically rotatably mounted on the axle, and a lever rigidly secured to the shaft and radially extended therefrom in angular relation to the arm, the shaft being rotatable in a predetermined direction to elevate the frame on the wheel and rotatable in an opposite direction when the frame is lowered, a cushioning elevationally adjustable control apparatus comprising an elongated outer sleeve, an inner rod longitudinally slidably mounted in the sleeve for relative reciprocal telescopic movement, means pivotally connecting the rod to the arm, means within the sleeve circumscribing the rod including a resiliently compressible member interposed the sleeve and the rod yieldably urging the sleeve and the rod to move longitudinally of each other to apply torque to the shaft tending to rotate the shaft in a predetermined direction and yieldably to cushion movement of the wheel toward the frame, and powered means mounted on the frame and connected to the sleeve for moving the rod and sleeve longitudinally of each other between a position compressing said member for increasing the torque applied to the shaft for rotating it in said predetermined direction and a position relieving such compression permitting the shaft to rotate in the opposite direction.

6. In a vehicle including a support frame and a ground engaging wheel adapted to support the frame for earth traversing movement along a predetermined line of travel, an apparatus for mounting the frame on the wheel for cushioned elevationally adjustable movement comprising an elongated shaft, means rotatably journaling the shaft in the frame in substantially horizontal position transversely of said line of travel, a wheel arm rigidly connected to the shaft and radially extended therefrom, a stub axle extended from the arm substantially parallel to the shaft, the wheel being concentrically rotatably mounted on the axle, a lever rigidly secured to the shaft and radially extended therefrom in angular relation to the arm, an hydraulic cylinder having a closed end pivotally connected to the frame for movement around an axis substantially parallel to the shaft and an opposite open end, the closed end of the cylinder providing an hydraulic passageway for admitting and releasing fluid to and from the cylinder, a substantially cylindrical piston longitudinally slidably fitted in the cylinder for reciprocal movement between an extended frame elevating position and a retracted frame lowering position incident to admission and release of fluid to and from the cylinder, an elongated substantially cylindrical sleeve having an end portion longitudinally slidably fitted over the cylinder and internally secured to the piston and an end portion oppositely endwardly extended from the cylinder, inner and outer bearing blocks secured within said extended end portion of the sleeve in longitudinally spaced relation to each other, an elongated rod longitudinally slidably mounted in the bearing blocks substantially coaxially of the sleeve and having an end pivotally connected to the lever for pivotal movement around an axis substantially parallel to the shaft, a collar rigidly secured to the rod intermediate the blocks, and a coiled compression spring encircling the rod between the inner block and the collar and having opposite ends respectively bearing against the inner block and the collar for resiliently yieldably urging the piston into retracted position and the wheel into ground engagement.

7. A telescopically adjustable control apparatus comprising an elongated sleeve having open opposite ends, an elongated control rod mounted in an end of the sleeve for longitudinal slidable movement inwardly and outwardly of the sleeve, resilient compression means interposed the sleeve and the rod yieldably urging the rod outwardly of the sleeve, a tubular member longitudinally slidably fitted in the end of the sleeve opposite from the rod having an outer closed end and an inner end, an elongated piston longitudinally extended within the tubular member having an inner end secured to the sleeve intermediate its opposite ends, the tubular member providing a fluid passageway extended from exteriorly of the tubular member and the sleeve to the interior of the tubular member between the closed end thereof and the piston, and means connected to the passageway in the tubular member for delivering and releasing hydraulic fluid to and from the passageway longitudinally extending and retracting the tubular member and the sleeve and piston relative to each other.

8. In a vehicle including a support frame, a ground engaging wheel adapted to support the frame for earth traversing movement along a predetermined line of travel, an elongated shaft, means rotatably journaling the shaft in the frame in substantially horizontal position transversely of said line of travel, a wheel arm rigidly connected to the shaft and radially extended therefrom, a stub axle extended from the arm substantially parallel to the shaft, the wheel being concentrically rotatably mounted on the axle, and a lever rigidly secured to the shaft and radially extended therefrom in angular relation to the arm, an apparatus for rotating the shaft between frame elevating and lowering positions and for cushioning the frame incident to elevational movements of the wheel relative to the frame comprising an hydraulic cylinder having a closed end pivotally connected to the frame for movement around an axis substantially parallel to the shaft and an opposite open end, the closed end of the cylinder providing an hydraulic passageway for admitting and releasing fluid to and from the cylinder, a substantially cylindrical piston longitudinally slidably fitted in the cylinder for reciprocal movement between an extended frame elevating position and a retracted frame lowering position incident to admission and release of fluid to and from the cylinder, an elongated substantially cylindrical sleeve having an end portion longitudinally slidably fitted over the cylinder and internally secured to the piston and an end portion oppositely endwardly extended from the cylinder, inner and outer bearing blocks secured within said extended end portion of the sleeve in longitudinally spaced relation to each other, an elongated rod longitudinally slidably mounted in the bearing blocks substantially coaxially of the sleeve and having an end pivotally connected to the lever for pivotal movement around an axis substantially parallel to the shaft, a collar rigidly secured to the rod intermediate the blocks, and a coiled compression spring encircling the rod between the inner block and the collar and having opposite ends respectively bearing against the inner block and the collar for resiliently yieldably urging the piston into retracted position and the wheel into ground engagement.

References Cited in the file of this patent

UNITED STATES PATENTS

| | | |
|---|---|---|
| 2,095,876 | Johnston | Oct. 12, 1937 |
| 2,227,762 | Ronning | Jan. 7, 1941 |
| 2,527,727 | Hobbs | Oct. 31, 1950 |
| 2,621,930 | Mead | Dec. 16, 1952 |
| 2,644,696 | Bill | July 7, 1953 |
| 2,650,108 | Bruce | Aug. 25, 1953 |